(12) United States Patent
Zhu et al.

(10) Patent No.: US 11,777,260 B2
(45) Date of Patent: Oct. 3, 2023

(54) CHARGING SOCKET AND LEAD FRAME ASSEMBLY AND CHARGING SOCKET

(71) Applicants: Tyco Electronics (Shanghai) Co., Ltd., Shanghai (CN); Tyco Electronics (Suzhou) Ltd., Suzhou (CN); Tyco Electronics Technology (SIP) Ltd., Jiangsu Province (CN)

(72) Inventors: Fangyue Zhu, Shanghai (CN); Jinshun Wang, Suzhou (CN); Renyi Dou, Suzhou (CN); Kaixuan Jiang, Shanghai (CN)

(73) Assignees: Tyco Electronics (Shanghai) Co., Ltd., Shanghai (CR); Tyco Electronics (Suzhou) Ltd., Suzhou (CN); Tyco Electronics Technology (SIP) Ltd., Jiangsu Province (CN)

(*) Notice: Subject to any disclaimer, the term of this patent is extended or adjusted under 35 U.S.C. 154(b) by 0 days.

(21) Appl. No.: 17/749,212

(22) Filed: May 20, 2022

(65) Prior Publication Data
US 2022/0385001 A1 Dec. 1, 2022

(30) Foreign Application Priority Data
May 25, 2021 (CN) .......................... 202121127140.7

(51) Int. Cl.
| H01R 13/66 | (2006.01) |
| H01R 4/62 | (2006.01) |
| H01R 13/11 | (2006.01) |
| H01R 13/652 | (2006.01) |

(52) U.S. Cl.
CPC ......... H01R 13/6683 (2013.01); H01R 4/625 (2013.01); H01R 13/11 (2013.01); H01R 13/652 (2013.01); H01R 13/6616 (2013.01)

(58) Field of Classification Search
CPC .... H01R 13/6683; H01R 4/625; H01R 13/11; H01R 13/652; H01R 13/6616; H01R 43/24; H01R 13/50; H01R 9/226; B60L 53/16
See application file for complete search history.

(56) References Cited

U.S. PATENT DOCUMENTS 10,126,327 B2 * 11/2018 Morel ...................... G01R 1/04

FOREIGN PATENT DOCUMENTS

EP 2615292 A1 * 7/2013 ............. B01D 29/60

* cited by examiner

*Primary Examiner* — Oscar C Jimenez
*Assistant Examiner* — Paul D Baillargeon

(57) ABSTRACT

The present invention discloses a charging socket lead frame assembly and a charging socket. The charging socket lead frame assembly has a lead frame which has a frame body and an electrical connection structure arranged in the frame body. The lead frame is adapted to be installed in a cavity of a charging socket, and a plurality of terminals of the charging socket are adapted to pass through the frame body. One end of the electrical connection structure is exposed from the frame body to electrically connect with a lead of a temperature sensor. The lead frame is arranged in non-electrical contact with at least one signal terminal of the charging socket. Therefore, the structure of the lead frame can be simplified and the manufacturing difficulty and cost can be reduced.

15 Claims, 4 Drawing Sheets

CHARGING SOCKET AND LEAD FRAME ASSEMBLY AND CHARGING SOCKET

CROSS-REFERENCE TO RELATED APPLICATION

This application claims the benefit of Chinese Patent Application No. 202121127140.7 filed on May 25, 2021 in the State Intellectual Property Office of China, the whole disclosure of which is incorporated herein by reference.

BACKGROUND OF THE INVENTION

Field of the Invention

The present invention relates to a charging socket lead frame assembly and a charging socket including the charging socket lead frame assembly.

Description of the Related Art

In the prior art, a plurality of signal terminals in the charging socket are in electrical contact with a lead frame installed in the charging socket and connected to a connector through an electrical connection structure in the lead frame. This will cause the structure of the lead frame to be too complex and difficult to manufacture.

In addition, in the prior art, in order to detect the electrical connection state between the charging gun and the charging socket, it is necessary to set a detection terminal (commonly referred to as CC signal terminal) and a resistor on the charging socket of the electric vehicle. Generally, the resistor is electrically connected between the detection terminal and a ground terminal (commonly referred to as PE terminal) of the charging socket. When the charging gun has been electrically connected with the charging socket, the detection terminal and ground terminal on the charging socket will be in electrical contact with the corresponding terminals on the charging gun, so that a resistor detection circuit is connected, and the resistor value of the resistor can be detected. That is, when the resistor detection circuit detects the resistor value of the resistor, it indicates that the charging gun has been electrically connected with the charging socket, otherwise it indicates that the charging gun has not been electrically connected with the charging socket.

In the prior art, both ends of the resistor are usually welded to the detection terminal and ground terminal of the charging socket by wires. In addition, in the prior art, the pin of the temperature sensor for detecting the temperature of the charging terminal is usually welded to the corresponding output terminal through a wire. The existing wire welding scheme has the defects of complex process and unstable quality.

SUMMARY OF THE INVENTION

The present invention has been made to overcome or alleviate at least one aspect of the above mentioned disadvantages.

According to an aspect of the present invention, there is provided a charging socket lead frame assembly comprising a lead frame which comprises a frame body and an electrical connection structure arranged in the frame body. The lead frame is adapted to be installed in a cavity of a charging socket, and a plurality of terminals of the charging socket are adapted to pass through the frame body; One end of the electrical connection structure is exposed from the frame body to electrically connect with a lead of a temperature sensor; The lead frame is arranged in non-electrical contact with at least one signal terminal of the charging socket.

According to an exemplary embodiment of the present invention, the charging socket lead frame assembly further comprises a first connection member and a second connection member; the first connection member and the second connection member are adapted to electrically contact a ground terminal and a detection terminal of the charging socket respectively, and electrically connect a resistor between the ground terminal and the detection terminal.

According to another exemplary embodiment of the present invention, at least one of the first connection member and the second connection member comprises of: a base wrapped in the frame body; a connection part connected to one end of the base and exposed from the outside of the frame body to be electrically connected with one connection end of the resistor; and a contact part connected to the other end of the base and exposed from the outside of the frame body to electrically contact with the ground terminal or the detection terminal.

According to another exemplary embodiment of the present invention, the contact part comprises a pair of elastic clamping arms adapted to clamp the ground terminal or the detection terminal to electrically contact with the ground terminal or the detection terminal.

According to another exemplary embodiment of the present invention, the connection part is adapted to be welded, crimped or riveted to one connection end of the resistor.

According to another exemplary embodiment of the present invention, the charging socket lead frame assembly further comprises a resistor, two connection ends of the resistor are electrically connected to the first connection member and the second connection member, respectively.

According to another exemplary embodiment of the present invention, the charging socket lead frame assembly further comprises a temperature sensor installed on the frame body and configured to detect the temperature of a power terminal connected with a power supply of the charging socket.

According to another exemplary embodiment of the present invention, the charging socket lead frame assembly further comprises a heat conduction pad installed on the frame body for transferring heat from the power terminal to the temperature sensor.

According to another exemplary embodiment of the present invention, a mounting slot is formed on the frame body, and the temperature sensor and the heat conduction pad are installed in the mounting slot.

According to another exemplary embodiment of the present invention, the lead frame is an insert injection molded part; the first connection member, the second connection member and the electrical connection structure are insert parts; and the frame body is an injection molded part.

According to another exemplary embodiment of the present invention, mounting slot further comprises a connector mounted on the frame body and including a housing and a conductive terminal arranged in the housing, the conductive terminal of the connector is electrically connected with the other end of the electrical connection structure to electrically connect the temperature sensor to the connector.

According to another exemplary embodiment of the present invention, the conductive terminal of the connector and the electrical connection structure are integrally formed; or the conductive terminal of the connector and the electrical connection structure are separately formed and electrically connected to each other.

According to another exemplary embodiment of the present invention, the housing of the connector and the frame body are integrally formed; or the housing of the connector and the frame body are formed separately and connected to each other.

According to another exemplary embodiment of the present invention, the frame body is provided with at least one opening to allow the signal terminal of the charging socket to pass through.

According to another aspect of the present invention, there is provided a charging socket comprising of: a seat body; a plurality of terminals installed in the seat body; and the above charging socket lead frame assembly installed in the seat body, the plurality of terminals include signal terminals, and at least one of the signal terminals is arranged in non-electrical contact with the charging socket lead frame assembly.

In the above exemplary embodiments according to the present invention, at least one signal terminal in the charging socket is arranged in non-electrical contact with the lead frame installed in the charging socket. Therefore, the structure of the lead frame can be simplified and the manufacturing difficulty and cost can be reduced.

In addition, in the foregoing exemplary embodiments according to the present invention, the two ends of the resistor are electrically connected to the detection terminal and the ground terminal respectively through the connection terminal in the lead frame. Therefore, it is not necessary to weld the two ends of the resistor to the detection terminal and the ground terminal respectively with wires, so as to simplify the manufacturing of the charging socket, save the cost, and improve the consistency and reliability of product quality.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS

Figure 1:
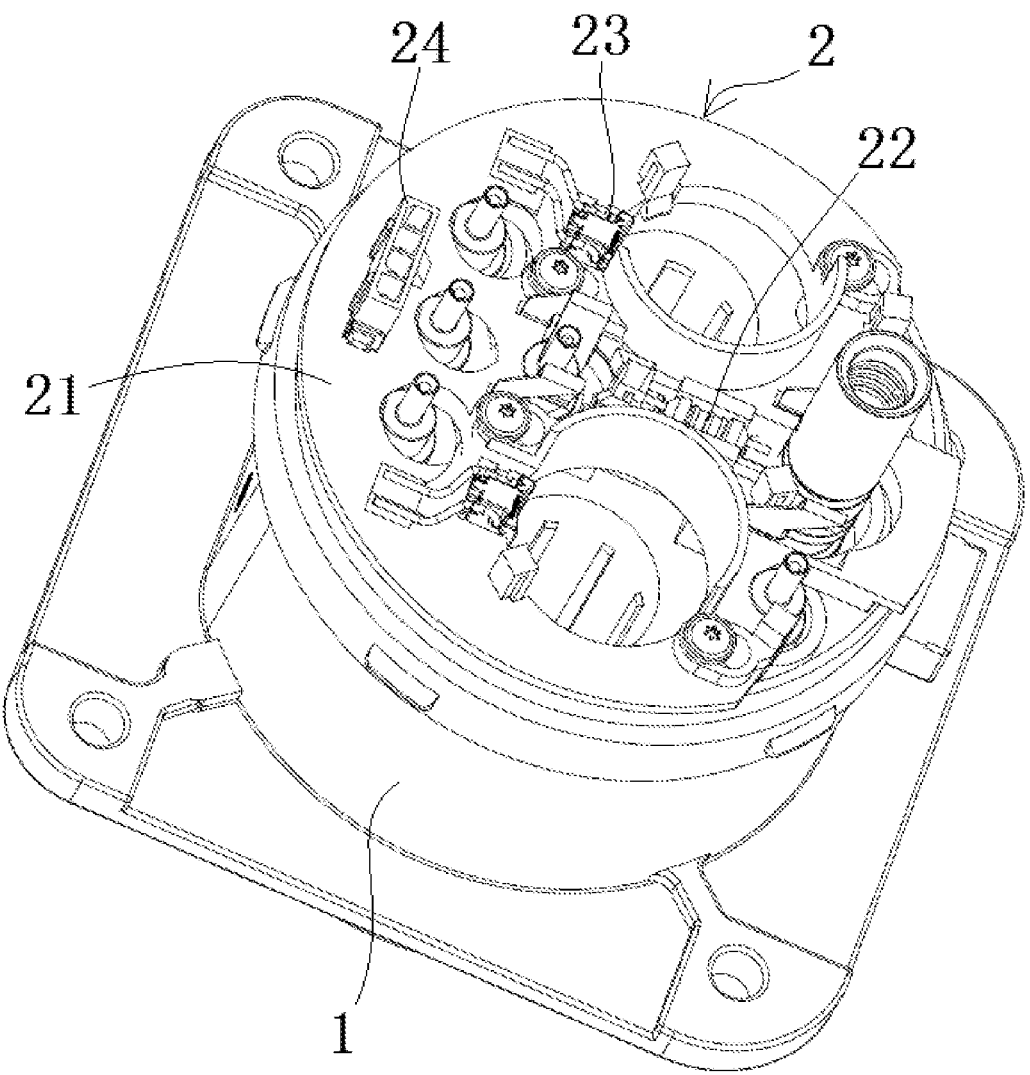
FIG. 1 shows a three-dimensional schematic diagram of a charging socket according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present invention, there is provided a charging socket lead frame assembly comprising a lead frame which comprises a frame body and an electrical connection structure arranged in the frame body. The lead frame is adapted to be installed in a cavity of a charging socket, and a plurality of terminals of the charging socket are adapted to pass through the frame body; One end of the electrical connection structure is exposed from the frame body to electrically connect with a lead of a temperature sensor; The lead frame is arranged in non-electrical contact with at least one signal terminal of the charging socket.

Figure 2:
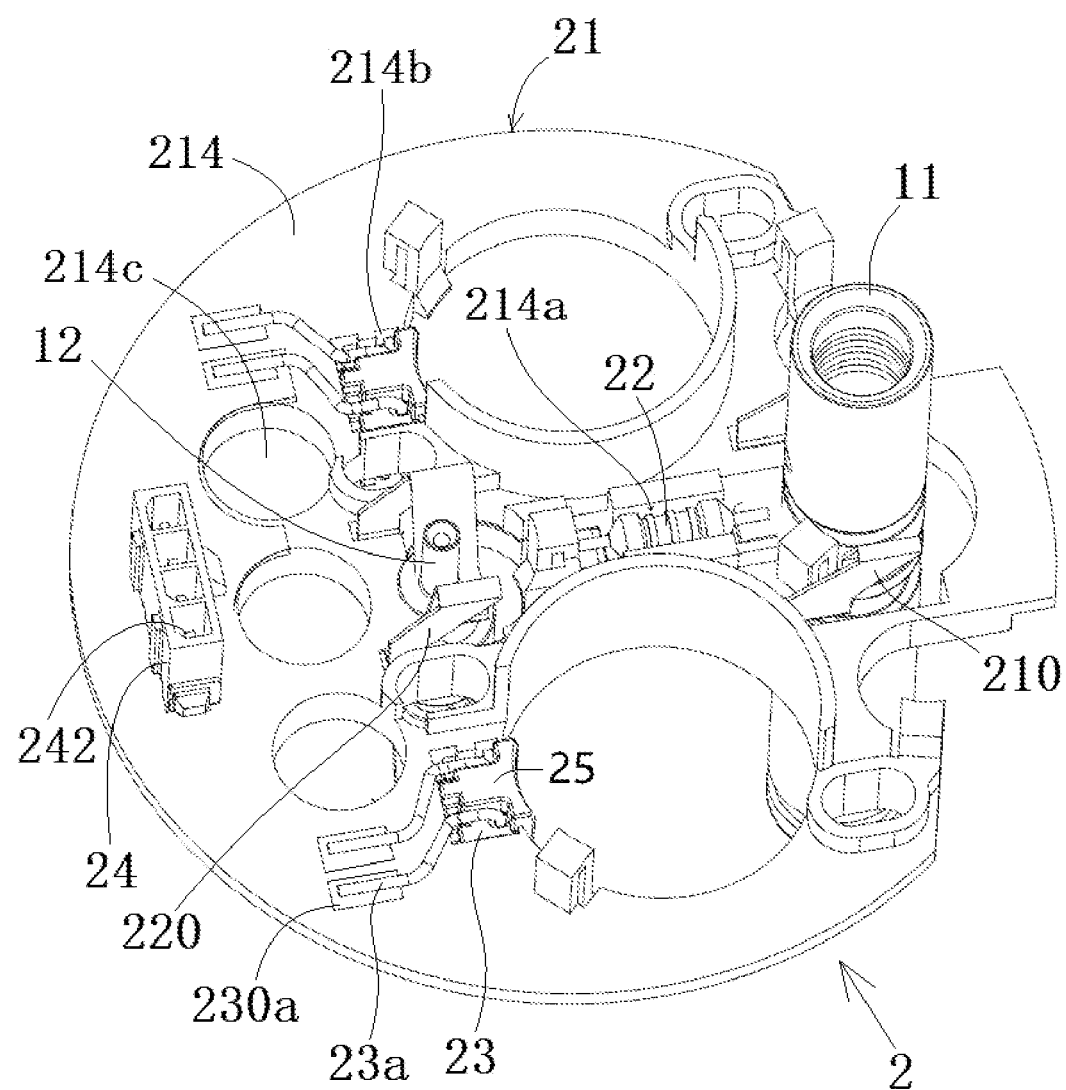
FIG. 2 shows a three-dimensional schematic diagram of a charging socket lead frame assembly according to an exemplary embodiment of the present invention, in which the detection terminal and ground terminal of the charging socket are shown.

FIG. 1 shows a three-dimensional schematic diagram of a charging socket according to an exemplary embodiment of the present invention; FIG. 2 shows a three-dimensional schematic diagram of the charging socket lead frame assembly 2 according to an exemplary embodiment of the present invention, in which the detection terminal 12 and the ground terminal 11 of the charging socket are shown.

As shown in FIGS. 1 and 2, in the illustrated embodiment, the charging socket mainly includes a seat body 1, a charging socket lead frame assembly 2 installed in the seat body 1, and a rear end cover (not shown) installed on the rear end of the seat body 1. The charging socket lead frame assembly 2 is accommodated in a rear cavity between the seat body 1 and the rear end cover.

Figure 3:
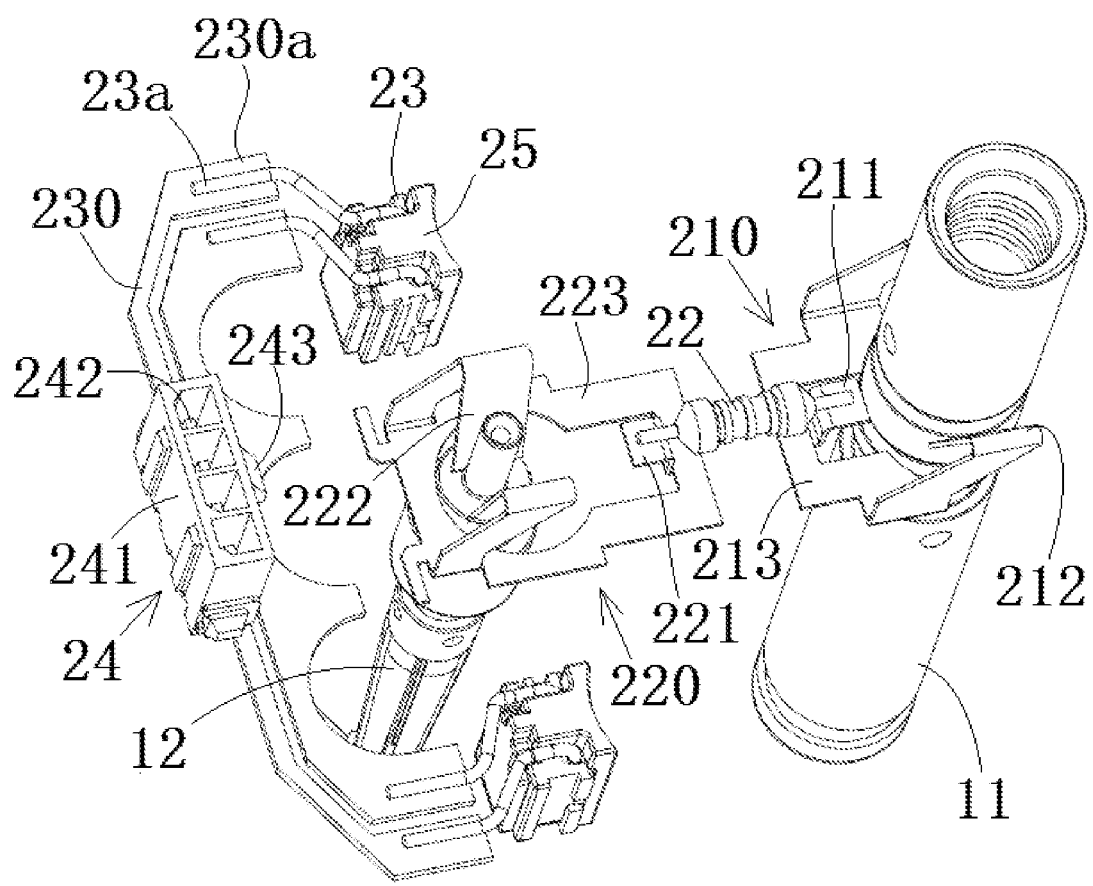
FIG. 3 shows the three-dimensional schematic diagram of the charging socket lead frame assembly shown in FIG. 2, in which the frame body of the lead frame is removed and the detection terminal and ground terminal of the charging socket are shown.
Figure 4:
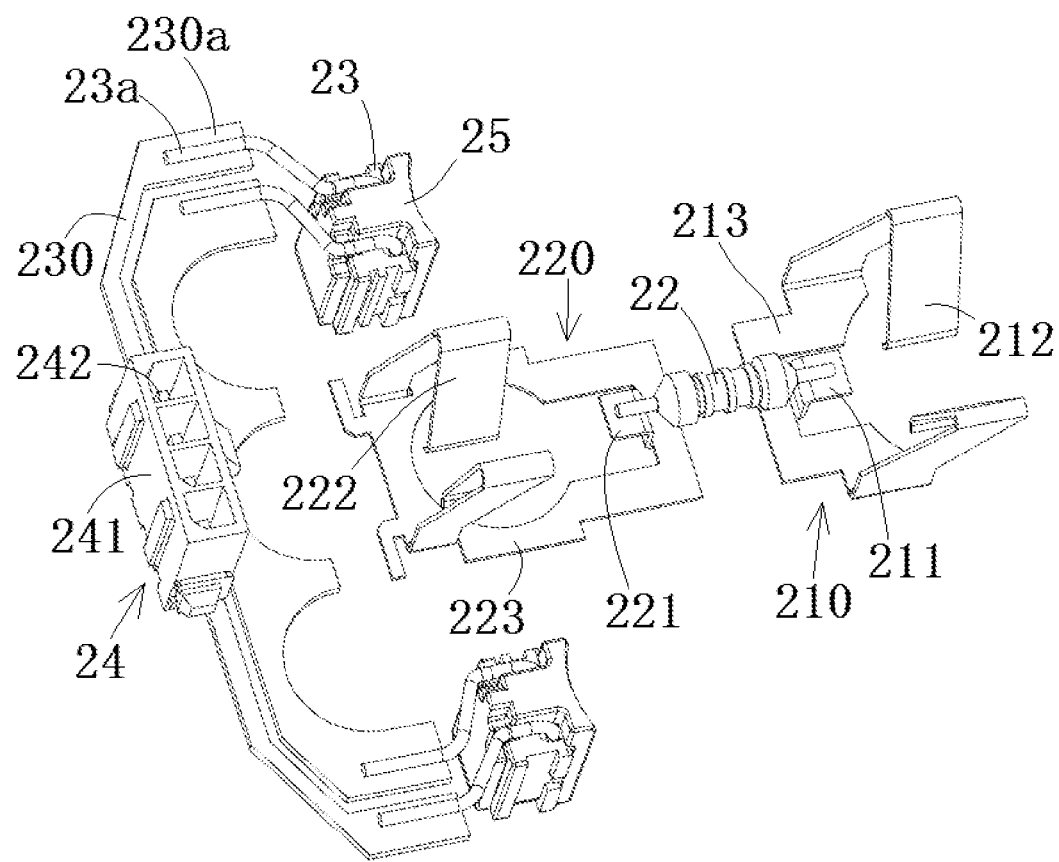
FIG. 4 shows the three-dimensional schematic diagram of the charging socket lead frame assembly shown in FIG. 3, in which the detection terminal and ground terminal of the charging socket are not shown.

FIG. 3 shows a three-dimensional schematic diagram of the charging socket lead frame assembly 2 shown in FIG. 2, in which the frame body 214 of the lead frame 21 is removed to show the detection terminal 12 and ground terminal 11 of the charging socket; FIG. 4 shows a three-dimensional schematic diagram of the charging socket lead frame assembly 2 shown in FIG. 3, in which the detection terminal 12 and the ground terminal 11 of the charging socket are not shown.

As shown in FIGS. 1 to 4, in the illustrated embodiment, the charging socket lead frame assembly 2 includes a lead frame 21 and a resistor 22. The lead frame 21 includes a frame body 214 and a first connection member 210 and a second connection member 220 arranged on the frame body 214. The two connection ends of the resistor 22 are electrically connected to the first connection member 210 and the second connection member 220, respectively.

As shown in FIGS. 1 to 4, in the illustrated embodiment, a plurality of openings 214c allowing a plurality of terminals installed in the seat body 1 to pass through are formed on the frame body 214 of the lead frame 21. The plurality of terminals in the seat body 1 include a plurality of signal terminals (not shown), and at least one of the plurality of signal terminals is arranged in non-electrical contact with the lead frame 21.

As shown in FIGS. 1 to 4, in the illustrated embodiment, the first connection member 210 and the second connection member 220 are suitable for electrical contact with the ground terminal 11 and the detection terminal 12 of the charging socket 1, respectively, to electrically connect the resistor 22 between the ground terminal 11 and the detection terminal 12.

As shown in FIGS. 1 to 4, in the illustrated embodiment, the first connection member 210 includes a first base 213, a first connection part 211 and a first contact part 212. The first base 213 is wrapped in the frame body 214 to fix the first connection member 210. The first connection part 211 is connected to one end of the first base 213 and exposed from the frame body 214 to be electrically connected with one connection end of the resistor 22. The first contact part 212 is connected to the other end of the first base portion 213 and exposed from the outside of the frame body 214 to electrically contact with the ground terminal 11.

As shown in FIGS. 1 to 4, in the illustrated embodiment, the second connection member 220 includes a second base 223, a second connection part 221 and a second contact part 222. The second base 223 is wrapped in the frame body 214 to fix the second connection member 220. The second connection part 221 is connected to one end of the second base 223 and exposed from the frame body 214 to be electrically connected with the other connection end of the resistor 22. The second contact part 222 is connected to the other end of the second base 223 and exposed from the frame body 214 to electrically contact with the detection terminal 12.

As shown in FIGS. 1 to 4, in the illustrated embodiment, the first contact part 212 of the first connection member 210 includes a pair of first elastic clamping arms suitable for clamping the ground terminal 11 to electrically contact with the ground terminal 11.

Similarly, in the embodiments shown in FIGS. 1 to 4, the second contact part 222 of the second connection member 220 includes a pair of second elastic clamping arms suitable for clamping the detection terminal 12 to electrically contact with the detection terminal 12.

As shown in FIGS. 1 to 4, in the illustrated embodiment, the first connection part 211 is welded to one end of the resistor 22, and the second connection part 221 is welded to the other end of the resistor 22. However, the present invention is not limited to the illustrated embodiment. The first connection part 211 or the second connection part 221 can also be electrically connected to the resistor 22 in other suitable ways. For example, the first connection part 211 or the second connection part 221 can also be crimped or riveted to the connection end of the resistor 22.

In the illustrated embodiment, the resistor 22 is a pin type resistor, but the present invention is not limited to this, and the resistor 22 can also be a chip type resistor.

Although not shown, in an exemplary embodiment of the present invention, a first notch is formed on the first connection member 210, a first groove is formed on the frame body 214, and the first pin of the resistor 22 is accommodated in the first groove and clamped in the first notch. Similarly, a second notch is formed on the second connection member 220, a second groove is formed on the frame body 214, and the second pin of the resistor 22 is accommodated in the second groove and clamped in the second notch.

As shown in FIGS. 1 to 4, in the illustrated embodiment, an accommodation groove 214*a* is formed on the frame body 214, and the resistor 22 is accommodated and positioned in the accommodation groove 214*a*.

As shown in FIGS. 1 to 4, in the illustrated embodiment, the charging socket lead frame assembly 2 also includes a temperature sensor 23. The temperature sensor 23 is installed on the frame 214 to detect the temperature of a power terminal (not shown, or referred to as the charging terminal) connected to the power supply of the charging socket.

As shown in FIGS. 1 to 4, in the illustrated embodiment, the charging socket lead frame assembly 2 also includes a heat conduction pad 25. The heat conduction pad 25 is installed on the frame body 214 to transfer heat from the power terminal to the temperature sensor 23.

As shown in FIGS. 1 to 4, in the illustrated embodiment, a mounting slot 214*b* is formed on the frame body 214; the temperature sensor 23 and the heat conduction pad 25 are installed in the mounting slot 214*b*.

As shown in FIGS. 1 to 4, in the illustrated embodiment, the lead frame 21 also includes an electrical connection structure 230 wrapped in the frame body 214. One end 230*a* of the electrical connection structure 230 is exposed from the frame body 214 and is electrically connected with the lead 23*a* of the temperature sensor 23. In the illustrated embodiment, one end 230*a* of the electrical connection structure 230 is in a pad shape, and the lead 23*a* of the temperature sensor 23 is welded to one end 230*a* of the electrical connection structure 230.

As shown in FIGS. 1 to 4, in the illustrated embodiment, the lead frame 21 is an insert injection molded part; the first connection member 210, the second connection member 220 and the electrical connection structure 230 are insert parts; the frame body 214 is an injection molded part. The lead frame 21 has the advantages of convenient manufacture, high quality and low cost, and can effectively ensure the consistency and reliability of product quality.

As shown in FIGS. 1 to 4, in the illustrated embodiment, the charging socket lead frame assembly 2 also includes a connector 24. The connector 24 is mounted on the frame body 214. The connector 24 mainly includes a housing 241 and a conductive terminal 242 arranged in the housing 241. The conductive terminal 242 of the connector 24 is electrically connected with the other end of the electrical connection structure 230 to electrically connect the temperature sensor 23 to the connector 24.

As shown in FIGS. 1 to 4, in an exemplary embodiment of the present invention, the conductive terminal 242 of the connector 24 and the electrical connection structure 230 can be integrally formed. In this way, the manufacturing is more simple and convenient. However, the present invention is not limited to this. For example, the conductive terminal 242 of the connector 24 and the electrical connection structure 230 can also be formed separately and electrically connected to each other.

As shown in FIGS. 1 to 4, in an exemplary embodiment of the present invention, the housing 241 of the connector 24 and the frame 214 are integrally formed. In this way, the manufacturing is more simple and convenient. However, the present invention is not limited to this. For example, the housing 241 of the connector 24 and the frame body 214 can also be formed separately and connected to each other.

As shown in FIGS. 1 to 4, in the illustrated embodiment, a snap structure 243 suitable for mating with the mating connector (not shown) is formed on the housing 241 of the connector 24, so that the connector 24 can be locked to the mating connector through the snap structure 243.

Although not shown, in the present invention, when the mating connector is mated with the connector 24 on the charging socket, the temperature signal detected by the temperature sensor 23 can be transmitted to a control system of an electric vehicle.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A charging socket lead frame assembly, comprising:
    a lead frame comprising a frame body and an electrical connection structure arranged in the frame body,
    wherein the lead frame is adapted to be installed in a cavity of a charging socket, and a plurality of terminals of the charging socket are adapted to pass through the frame body,
    wherein one end of the electrical connection structure is exposed from the frame body to electrically connect with a lead of a temperature sensor,
    wherein the lead frame is arranged in non-electrical contact with at least one signal terminal of the charging socket.

2. The charging socket lead frame assembly according to claim 1, further comprising:
    a first connection member and a second connection member,
    wherein the first connection member and the second connection member are adapted to electrically contact a ground terminal and a detection terminal of the charging socket respectively, and electrically connect a resistor between the ground terminal and the detection terminal.

3. The charging socket lead frame assembly according to claim 2, wherein at least one of the first connection member and the second connection member comprises:
    a base wrapped in the frame body;
    a connection part connected to one end of the base and exposed from the outside of the frame body to be electrically connected with one connection end of the resistor; and
    a contact part connected to the other end of the base and exposed from the outside of the frame body to electrically contact with the ground terminal or the detection terminal.

4. The charging socket lead frame assembly according to claim 3,
    wherein the contact part comprises a pair of elastic clamping arms adapted to clamp the ground terminal or the detection terminal to electrically contact with the ground terminal or the detection terminal.

5. The charging socket lead frame assembly according to claim 3, wherein the connection part is adapted to be welded, crimped or riveted to one connection end of the resistor.

6. The charging socket lead frame assembly according to claim 2, further comprising:
    a resistor, two connection ends of which are electrically connected to the first connection member and the second connection member, respectively.

7. The charging socket lead frame assembly according to claim 2,
    wherein the lead frame is an insert injection molded part; the first connection member, the second connection member and the electrical connection structure are insert parts; and the frame body is an injection molded part.

8. The charging socket lead frame assembly according to claim 1, further comprising:
    a temperature sensor installed on the frame body and configured to detect the temperature of a power terminal connected with a power supply of the charging socket.

9. The charging socket lead frame assembly according to claim 8, further comprising:
    a heat conduction pad installed on the frame body for transferring heat from the power terminal to the temperature sensor.

10. The charging socket lead frame assembly according to claim 9,
    wherein a mounting slot is formed on the frame body, and the temperature sensor and the heat conduction pad are installed in the mounting slot.

11. The charging socket lead frame assembly according to claim 1, further comprising:
    a connector mounted on the frame body and including a housing and a conductive terminal arranged in the housing,
    wherein the conductive terminal of the connector is electrically connected with the other end of the electrical connection structure to electrically connect the temperature sensor to the connector.

12. The charging socket lead frame assembly according to claim 11,
    wherein the conductive terminal of the connector and the electrical connection structure are integrally formed; or
    wherein the conductive terminal of the connector and the electrical connection structure are separately formed and electrically connected to each other.

13. The charging socket lead frame assembly according to claim 11,
    wherein the housing of the connector and the frame body are integrally formed; or
    wherein the housing of the connector and the frame body are formed separately and connected to each other.

14. The charging socket lead frame assembly according to claim 1,
    wherein the frame body is provided with at least one opening to allow the signal terminal of the charging socket to pass through.

15. A charging socket, comprising:
    a seat body;
    a plurality of terminals installed in the seat body; and
    a charging socket lead frame assembly comprising a lead frame,
    wherein the lead frame comprises a frame body and an electrical connection structure arranged in the frame body,
    wherein the lead frame is adapted to be installed in a cavity of a charging socket, and a plurality of terminals of the charging socket are adapted to pass through the frame body, wherein one end of the electrical connection structure is exposed from the frame body to electrically connect with a lead of a temperature sensor,
wherein the plurality of terminals include signal terminals, and at least one of the signal terminals is arranged in non-electrical contact with the charging socket lead frame assembly.

\* \* \* \* \*